United States Patent
Afaneh et al.

(10) Patent No.: US 9,441,687 B2
(45) Date of Patent: Sep. 13, 2016

(54) BRAKE PAD ASSEMBLY WITH UNIVERSAL SHIM

(71) Applicant: Wolverine Advanced Materials, LLC, Dearborn, MI (US)

(72) Inventors: Abdul-Hafiz Ahmed Afaneh, Dearborn, MI (US); Irfan A. Bhatti, Farmington Hills, MI (US)

(73) Assignee: Wolverine Advanced Materials, LLC, Dearborn, MI (US)

( * ) Notice: Subject to any disclaimer, the term of this patent is extended or adjusted under 35 U.S.C. 154(b) by 0 days.

(21) Appl. No.: 14/225,008

(22) Filed: Mar. 25, 2014

(65) Prior Publication Data

US 2015/0275994 A1    Oct. 1, 2015

(51) Int. Cl.
*F16D 55/00* (2006.01)
*F16D 65/097* (2006.01)
*F16D 66/02* (2006.01)

(52) U.S. Cl.
CPC ....... *F16D 65/0971* (2013.01); *F16D 65/0977* (2013.01); *F16D 66/022* (2013.01)

(58) Field of Classification Search
CPC ....... F16D 66/02; F16D 66/00; F16D 66/026
USPC .................. 188/73.31, 250 R, 250 G, 1.11 W
See application file for complete search history.

(56) References Cited

U.S. PATENT DOCUMENTS

| | | | | |
|---|---|---|---|---|
| 3,141,524 A | * | 7/1964 | Mishler | 188/1.11 W |
| 4,005,766 A | * | 2/1977 | Kennel | 188/1.11 R |
| 4,745,992 A | * | 5/1988 | Lusa | 188/1.11 W |
| 5,499,696 A | * | 3/1996 | Kobayashi et al. | 188/1.11 W |
| 5,509,508 A | | 4/1996 | Evans | |
| 5,706,917 A | * | 1/1998 | Matsuzaki | F16D 65/0979 |
| | | | | 188/250 D |
| 6,116,384 A | * | 9/2000 | Matsumoto et al. | 188/73.31 |
| 6,298,956 B1 | * | 10/2001 | Gerhardt | F16D 65/092 |
| | | | | 188/73.35 |
| 7,726,450 B2 | | 6/2010 | Bosco, Jr. | |
| 7,849,982 B1 | * | 12/2010 | Tamura et al. | 188/250 G |
| D688,609 S | | 8/2013 | Arbesman et al. | |
| 2004/0163903 A1 | * | 8/2004 | Saka | 188/250 G |
| 2006/0157307 A1 | * | 7/2006 | Tsurumi | F16D 65/092 |
| | | | | 188/250 G |
| 2008/0087503 A1 | | 4/2008 | Wake et al. | |

(Continued)

FOREIGN PATENT DOCUMENTS

| | | | |
|---|---|---|---|
| GB | 1492611 A | * | 11/1977 |
| GB | 2103737 | | 2/1983 |
| JP | 09-264354 | | 10/1997 |
| JP | 11-218165 | | 8/1999 |
| JP | 2006-200560 | | 8/2006 |

(Continued)

OTHER PUBLICATIONS

International Search Report and Written Opinion for Application No. PCT/US2015/015244, Dated May 7, 2015, 12 pages.

*Primary Examiner* — Robert A Siconolfi
*Assistant Examiner* — Mahbubur Rashid
(74) *Attorney, Agent, or Firm* — Foley & Lardner LLP

(57) ABSTRACT

A brake pad assembly includes a backing plate having a first surface and a second surface opposite the first surface, a brake liner coupled to the first surface of the backing plate and configured to engage a braking surface, and a shim coupled to the second surface of the backing plate, the shim including a planar body portion and a plurality of tabs integrally formed with and extending from the planar body portion. A first tab of the plurality of tabs is configured to secure the shim to the backing plate and to engage the braking surface when the brake liner is worn a predetermined amount.

20 Claims, 6 Drawing Sheets

(56) References Cited

U.S. PATENT DOCUMENTS

2010/0170756 A1* 7/2010 Chung ............... F16D 65/0972
                                                    188/73.37
2013/0068574 A1   3/2013 Arbesman

FOREIGN PATENT DOCUMENTS

| | | |
|---|---|---|
| JP | 2013-053687 | 3/2013 |
| KR | 10-2001-0062949 | 7/2001 |
| KR | 10-2009-0090060 | 8/2009 |

* cited by examiner

BRAKE PAD ASSEMBLY WITH UNIVERSAL SHIM

BACKGROUND

Brake pad assemblies are used in brake systems, such as disc brake systems in automobiles. The brake pad assembly includes a liner coupled to a backing plate. The liner engages a rotor to slow a vehicle. A shim may be used to dampen vibrations generated by the interface between the liner and the rotor.

SUMMARY

One embodiment relates to a brake pad assembly including a backing plate having a first surface and a second surface opposite the first surface, a brake liner coupled to the first surface of the backing plate and configured to engage a braking surface, and a shim coupled to the second surface of the backing plate, the shim including a planar body portion and a plurality of tabs integrally formed with and extending from the planar body portion. A first tab of the plurality of tabs is configured to secure the shim to the backing plate and to engage the braking surface when the brake liner is worn a predetermined amount.

Another embodiment relates to a brake pad assembly including a backing plate having a first surface and a second surface opposite the first surface, a brake liner coupled to the first surface of the backing plate and configured to engage a braking surface, and a shim coupled to the second surface of the backing plate, the shim including a planar body portion and a plurality of tabs integrally formed with and extending from the planar body portion. A first tab of the plurality of tabs is configured to secure the shim to the backing plate, and wherein a second tab of the plurality of tabs is configured to engage the braking surface when the brake liner is worn a predetermined amount.

Another embodiment relates to a brake pad assembly including a backing plate having a first surface, a second surface opposite the first surface, and a channel extending at least partially between the first surface and the second surface, a brake liner coupled to the first surface of the backing plate and configured to engage a braking surface, and a shim coupled to the second surface of the backing plate, the shim including a planar body portion and a tab integrally formed with and extending from the planar body portion such that the tab is received within the channel to couple the shim to the backing plate. The tab and the channel are configured to permit relative movement between the second surface of the backing plate and the shim when the brake liner engages the braking surface.

The invention is capable of other embodiments and of being practiced or being carried out in various ways. Alternative exemplary embodiments relate to other features and combinations of features as may be generally recited in the claims.

BRIEF DESCRIPTION

The invention will become more fully understood from the following detailed description, taken in conjunction with the accompanying drawings, wherein like reference numerals refer to like elements.

DETAILED DESCRIPTION

Various embodiments disclosed herein relate to brake systems for vehicles, and more particularly, to brake pad assemblies used in brake systems such as disc brake systems for automobiles and other vehicles. In some embodiments, a brake pad assembly includes a backing plate and a brake liner coupled to the backing plate. The brake liner is configured to be forced against a braking surface to apply a braking force to the braking surface. The braking surface is typically provided as part of a rotor that is coupled (e.g., rotationally fixed) to a vehicle wheel, such that applying a braking force to the braking surface of the rotor results in slowing of the rotational speed of the wheel, and in turn, the speed of the vehicle.

In one embodiment, the brake pad assembly includes a shim (e.g., a universal shim) coupled to the backing plate. The shim includes a plurality of integrally formed tabs that serve to couple the shim to the backing plate and/or serve as wear indicators for the brake liner. The shim may be a multi-layer shim, with the tabs being formed out of the multi-layer material. Further, the tabs may be received within channels in the sides of the backing plate with a predetermined amount of relative movement of components designed into the assembly by way of clearances between the components.

Figure 1:
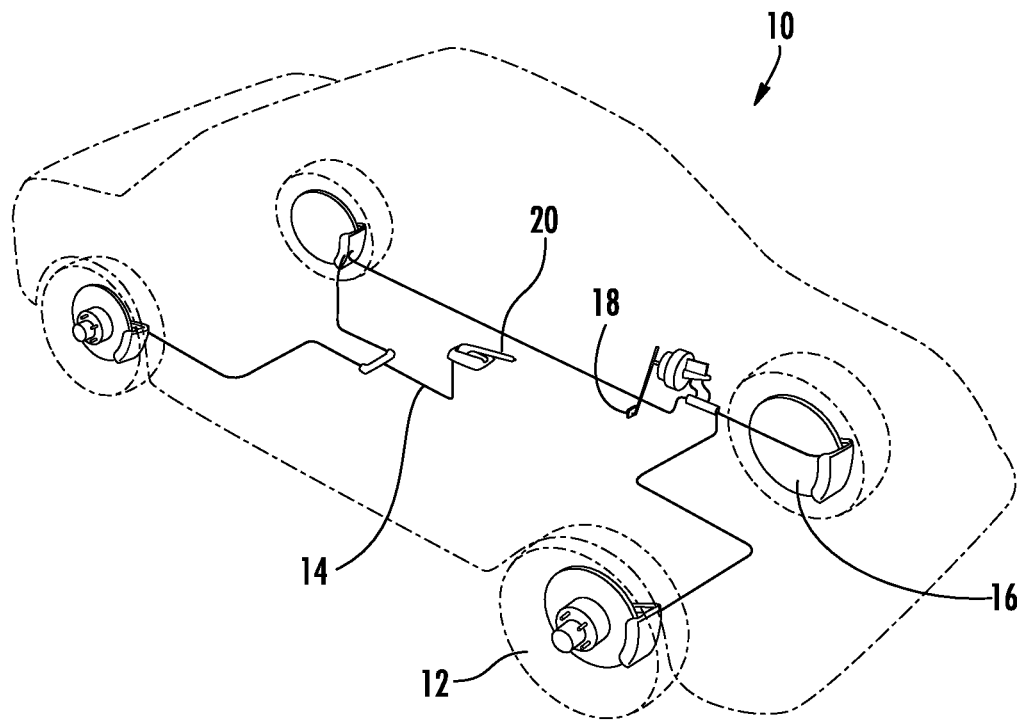
FIG. 1 is a schematic view of a vehicle according to one embodiment.

Referring now to FIG. 1, a vehicle 10 is shown according to one embodiment and includes a number of wheels 12 and a brake system 14. Vehicle 10 may be any suitable vehicle, such as an automobile, motorcycle, and the like. Brake system 14 is configured to slow vehicle 10 by way of actuation of one or more brake assemblies 16. Brake assemblies 16 are actuated by way of an actuation device such as a brake pedal 18, brake lever 20, or other suitable mechanism.

Figure 2:
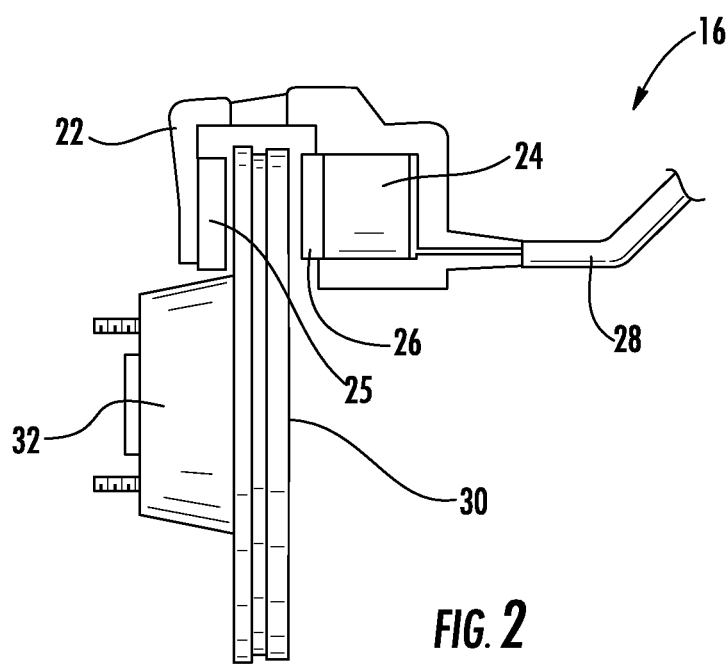
FIG. 2 is a side view of a brake assembly usable with the vehicle of FIG. 1 according to one embodiment.
Figure 3:
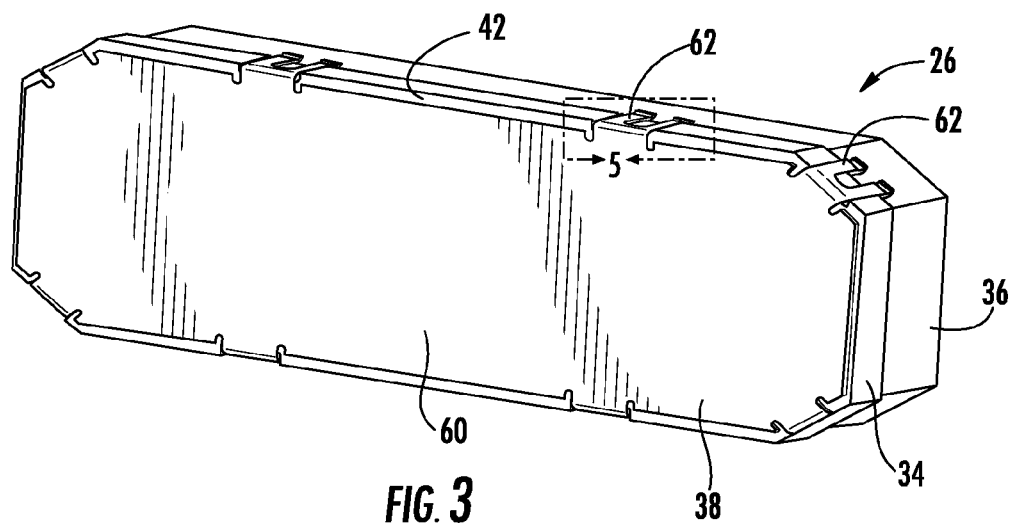
FIG. 3 is a front perspective view of a brake pad assembly usable with the brake assembly of FIG. 2 according to one embodiment.
Figure 4:
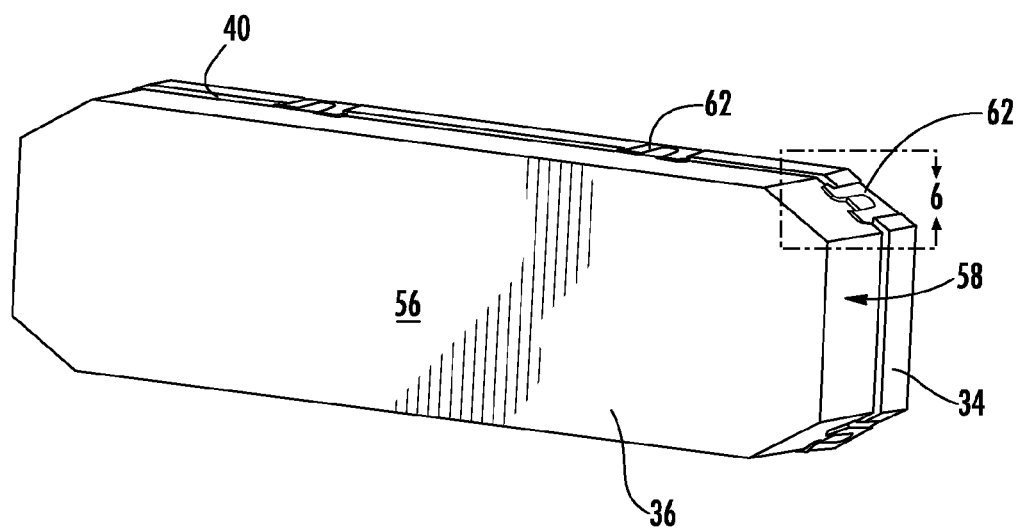
FIG. 4 is a rear perspective view of the brake pad assembly of FIG. 3.

Referring to FIG. 2, brake assembly 16 is shown in greater detail according to one embodiment. Brake assembly 16 includes a caliper 22 that engages brake pad assemblies 25, 26. One or both of brake pad assemblies 25, 26 is coupled to a piston 24, which is moved by way of fluid pressure applied through a fluid line 28. As piston 24 moves, brake pad assemblies 25, 26 are moved either toward or away from each other.

As shown in FIG. 2, in order to actuate brake assembly 16, fluid is directed through fluid line 28 to move piston 24 and brake pad assembly 26 toward rotor 30. Rotor 30 includes a braking surface that frictionally engages brake pad assembly 26. Rotor 30 is coupled to hub 32 and wheel 12. As such, as brake pad assembly 26 is forced against the braking surface of rotor 30, the rotational speed of wheel 12 is reduced as the kinetic energy of the vehicle is converted into thermal energy by way of the frictional interface between the brake pad assembly and the braking surface of the rotor. According to various alternative embodiments, in addition to or rather than being moved by way of piston 24, brake pad assembly 26 may be moved using other means, including an electric motor, etc. For example, in the case of an electronic parking brake system, an electric motor may be configured to provide movement of brake pad assembly to engage the braking surface of the rotor.

Referring now to FIGS. 3-7, brake pad assembly 26 is shown in greater detail according to one embodiment. It should be understood that in some embodiments, any of the features discussed herein with respect to brake pad assembly 26 are equally applicable to brake pad assembly 25. In other embodiments, brake pad assembly 25 and brake pad assembly 26 include different structural features. Furthermore, brake pad assembly 26 is intended to be usable with a variety of vehicles and/or brake assemblies, such that the shape of brake pad assembly 26 may change depending upon the particular application. For example, while in FIGS. 3-4 brake pad assembly 26 is shown for illustration purposes as having a generally rectangular shape, in other embodiments, brake pad assembly 26 may take other forms, including having arcuate sides, etc.

According to one embodiment, brake pad assembly 26 includes backing plate 34 (e.g., a backer plate or support, etc.), brake liner 36 (e.g., a brake pad, friction member or material, etc.), and shim 38 (e.g., a universal shim, a damping member, etc.). Liner 36 is coupled to a first side 40 of backing plate 34, and shim 38 is coupled to a second side 42 of backing plate 34 (see, e.g., FIG. 7). Liner 36 includes a frictional surface 56 (e.g., a braking or abrasive surface) that is configured to engage a braking surface of a rotor or similar device. Liner 36 further includes side surface 58 extending from frictional surface 56 toward backing plate 34.

Liner 36 can be made of any suitable material configured for applying a frictional force against a braking surface. In one embodiment, liner 36 includes a semi-metallic material (e.g., incorporating copper or steel fibers), while in other embodiments liner 36 includes various organic materials, such as glass, rubber, etc. Other materials can be used according to various alternative embodiments to vary the abrasiveness, stiffness, or other characteristics of the brake liner, depending on the application.

Figure 5:
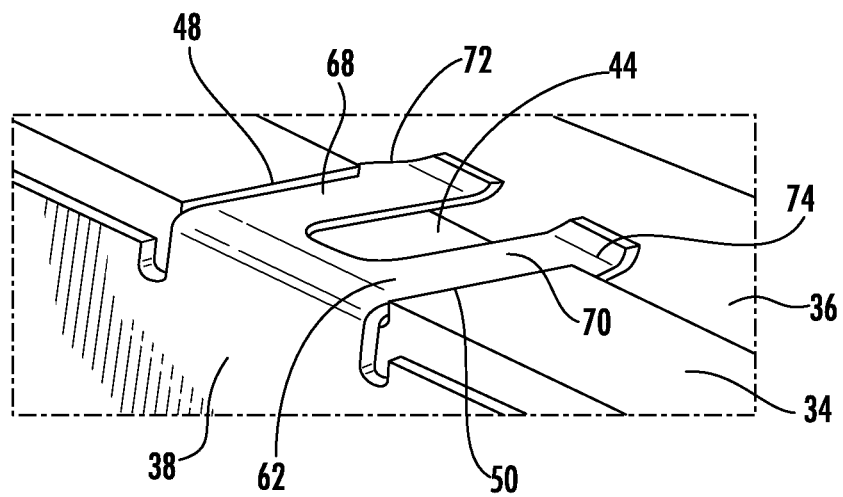
FIG. 5 is a detail view of a tab usable with the brake pad assembly of FIGS. 3-4 according to one embodiment.
Figure 6:
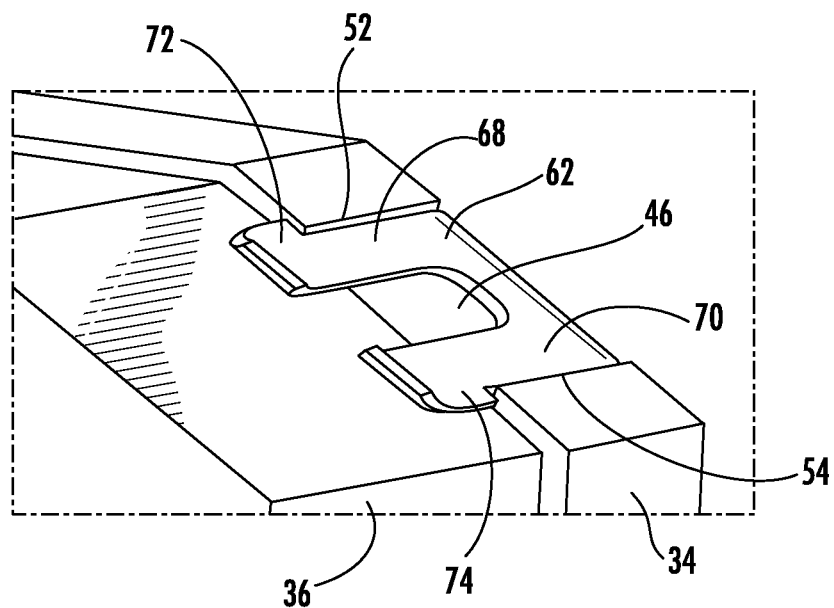
FIG. 6 is a detail view of a tab usable with the brake pad assembly of FIGS. 3-4 according to one embodiment.
Figure 7:
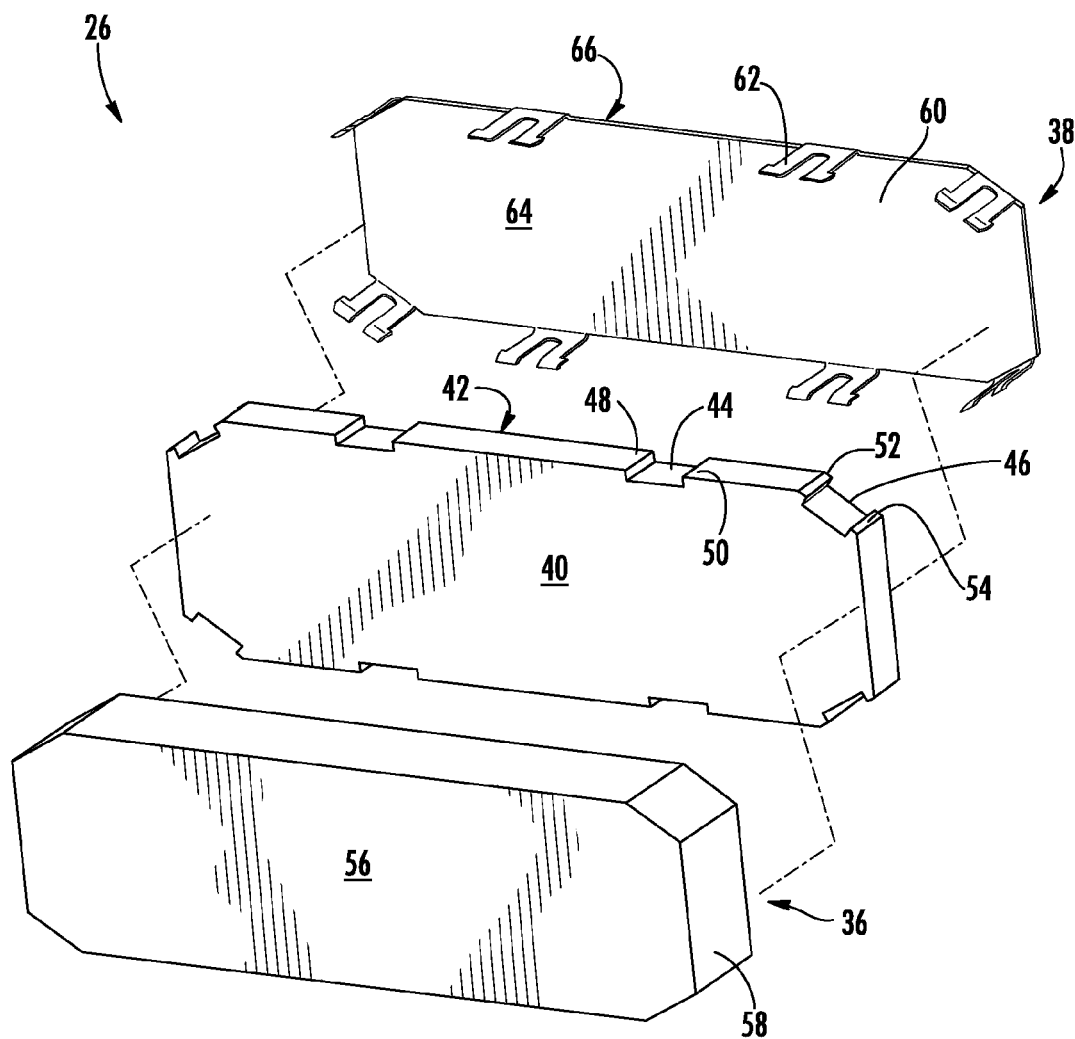
FIG. 7 is an exploded view of the brake pad assembly of FIGS. 3-4 according to one embodiment.

Backing plate 34 is in one embodiment made of a metal material (e.g., steel, etc.). Backing plate 34 serves as a support for liner 36, shim 38, and/or other components of brake pad assembly 26. In one embodiment, backing plate 34 is a generally planar member having opposite sides 40, 42 (e.g., first and second opposite sides). One or more channels 44, 46 extend entirely or partially between sides 40, 42. As shown in FIGS. 5-7, channel 44 is formed by wall portions 48, 50, and channel 46 is formed by wall portions 52, 54.

Referring further to FIGS. 3-7, shim 38 includes a body portion 60 and a plurality of tabs 62 extending from body portion 60. Shim 38 includes a first side or surface 64 and an opposite side or surface 66. Tabs 62 are integrally formed with body portion 60 such that in one embodiment, body portion 60 and tabs 62 form a generally continuous surface. For example, in one embodiment, shim 38 is made of a metal material using a stamping and bending process such that body portion 60 and tabs 62 are stamped and bent from a single piece of material such as a metal. In other embodiments, shim 38 may be made of other materials (e.g., plastics, composites, etc.) and made using other methods (e.g., forming, molding, etc.).

According to one embodiment, tabs 62 are configured to couple shim 38 to backing plate 34. Tabs 62 extend toward liner 36 and engage one or both of the side surfaces of backing plate 34 and liner 36. In one embodiment, tabs 62 are resilient such that tabs 62 provide a retaining force in a direction generally perpendicular to the side surfaces of backing plate 34 and/or liner 36. In other embodiments, tabs 62 are snap-fit onto backing plate 34.

Referring to FIGS. 5-6, according to one embodiment, tabs 62 are received within channels such as channels 44, 46 in backing plate 34. For example, as shown in FIGS. 5-6, a first tab 62 is received in channel 44 formed by wall portions 48, 50, and a second tab 62 is received in channel 46 formed by wall portions 52, 54. Channels 44, 46 are in one embodiment similar in structure, and differ in their location on backing plate 34. In one embodiment, channels 44, 46 are spaced about the periphery of backing plate 34. The channels may be equally or unequally spaced, and any suitable number of channels may be utilized.

As shown in FIGS. 5-6, in one embodiment, tab 62 includes a pair of extensions 68, 70. Extensions 68, 70 are spaced apart and form elongated members that extend away from body portion 60 of shim 38. Extensions 68, 70 in one embodiment include retaining portions 72, 74 (e.g., a lip, flange, etc.) that extend outward and in opposition directions. In one embodiment, retaining portions 72, 74 extend beyond the wall portions forming the channel in backing plate 34 so as to prevent separation of shim 38 from backing plate 34. Extensions 68, 70 may be made of a resilient material and be configured to apply an inwardly-directed biasing force on backing plate 34 and/or liner 36.

In some embodiments, tab 62 extends past backing plate 34 and engages liner 36. For example, extensions 68, 70 may extend past backing plate 34 and engage the side surfaces of liner 36. In one embodiment, tab 62 engages liner 36 in a frictional manner to provide additional damping of unwanted vibrations, etc. In alternative embodiments, some or all of tabs 62 do not engage liner 36, or the force applied to the liner may vary between tabs.

In addition to coupling shim 38 to backing plate 34, one or more tabs 62 may act as wear indicators for brake pad assembly 26. Generally, a wear indicator provides an audible indication (e.g., a noise), when the liner becomes worn to a predetermined extent. For example, a piece of metal may be positioned adjacent the liner such that once the liner is worn to a predetermined extent, the piece of metal comes in contact with a braking surface, thereby generating a warning noise (e.g., a squeal or similar noise resulting from metal on metal contact/movement). In one embodiment, tab 62 is configured to act as a wear indicator.

Figure 10:
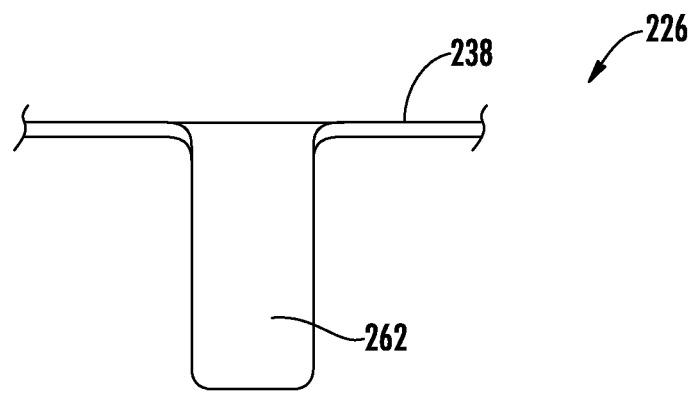
FIG. 10 is a side view of a portion of a shim according to another embodiment.

In further embodiments, multiple tabs 62 are configured to both couple shim 38 to backing plate 34 and to act as wear indicators. For example, multiple tabs may be configured to act as wear indicators so as to identify wear in cases of uneven wearing of the liner. As such, the tabs may be spaced apart so as to detect any tapering, etc. of the liner during use. In some embodiments, one or more dedicated wear indicator tabs are formed as part of shim 38 (e.g., such that the tabs serve only as wear indicators, and are not configured to couple shim 38 to backing plate 34). For example, as shown in FIG. 10, a shim 238 may include a dedicated wear indicator tab 262 (in addition to other tabs such as those disclosed elsewhere herein).

Figure 8:
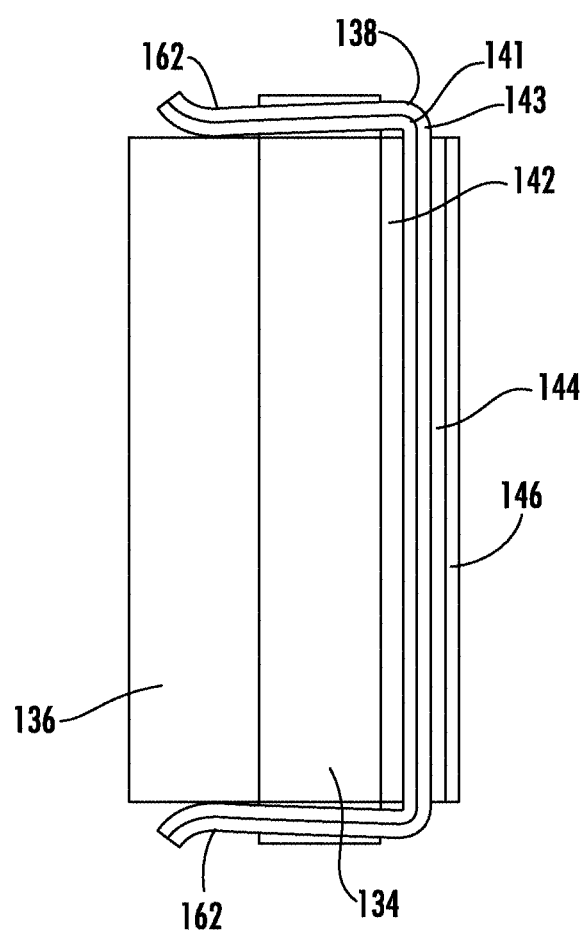
FIG. 8 is a cross-section view of a brake pad assembly according to another embodiment.

Referring now to FIG. 8, a cross-section of a brake pad assembly 126 is shown according to another embodiment.

Brake pad assembly 126 can include any and all of the features of brake pad assembly 26, and includes a backing plate 134, a liner 136, and a shim 138. As shown in FIG. 8, shim 138 is in one embodiment a multi-layer shim made of separate layers 141, 143 of material (e.g., metal, plastic, adhesive, etc.). While shim 138 is shown in FIG. 8 to include two layers, according to various alternative embodiments, more layers may be included (e.g., three, four, etc.) and the layers may be made of any suitable material (e.g., adhesives, metals, polymers, etc.) and have any suitable size, thickness, etc. In one embodiment, all of the layers of shim 138 extend over the entire surface of the shim (e.g., including tabs 162). In other embodiments, one or more layers may not extend to the tab portions of shim 138.

In one embodiment, shim 138 is a multi-layer shim that is formed by first coupling multiple layers of material together as a flat sheet of laminated material. The sheet of laminated material is then cut (e.g., stamped, etc.) to a desired shape, and one or more tabs are bent to a desired shape. In other embodiments, shim 138 can be formed using other methods (e.g., forming processes, molding processes, etc.).

In addition to being a multi-layer component, shim 138 (or, similarly, shim 38) in some embodiments acts as a carrier for additional shims or layers of material (e.g., adhesive layers, etc.). For example, as shown in FIG. 8, shim 138 acts as a carrier for layers 142, 144, 146. Layers 142, 144, 146 may be additional shims, layers of adhesive (e.g., double-sticky adhesive layers, etc.), or other components. In one embodiment, shim 138 couples layers 142, 144, 146 to backing plate 134 (e.g., such that layer 142 is not separately coupled or otherwise adhered to backing plate 134). In other embodiments, one or more of layers 142, 144, and 146 are separately coupled to backing plate 134 in addition to being coupled to shim 138.

Figure 9:
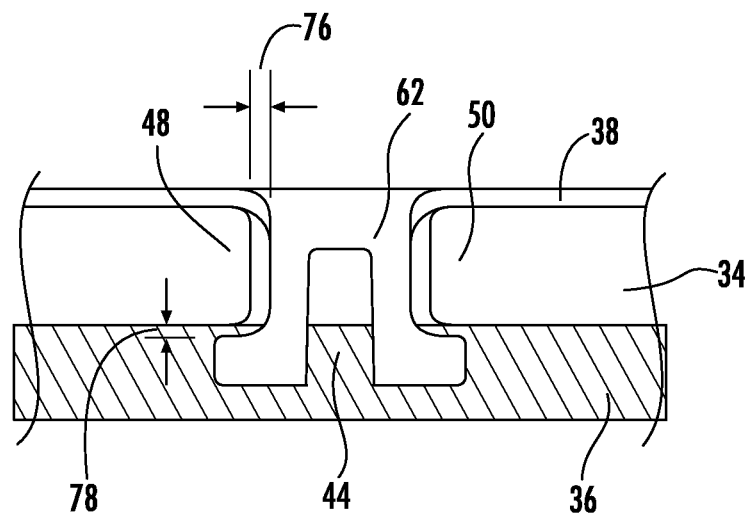
FIG. 9 is a side view of a portion of a brake pad assembly according to one embodiment.

Referring now to FIG. 9, tab 62 of shim 38 is shown received within channel 44 of backing plate 34 according to one embodiment. As shown in FIG. 9, in some embodiments, gaps, or spaces, 76, 78 are provided between tab 62 and wall portions 48, 50 of backing plate 34. The gaps permit relative movement between parts. In one embodiment, relative movement is permitted in a lateral direction (e.g., in a sliding fashion) between shim 38 and backing plate 34 due to gap 76. In another embodiment, shim 38 is permitted to move toward or away from backing plate 34 and liner 36 (e.g., in a direction perpendicular to surface 42 of backing plate 34) due to gap 78. In further embodiments, both types of relative movement are permitted. In an alternative embodiment, no gaps are provided between tab 62 and wall portions 48, 50 and 52, 54 such that there is substantially no relative movement between shim 38 and backing plate 34.

It should be noted that the brake pad assemblies and brake assemblies disclosed herein may provide various advantages over more traditional components. For example, providing one or more tabs on a brake shim that serve to both couple the shim to a backing plate and act as a wear indicator may reduce manufacturing time and cost, as fewer steps and different materials are require. Further, the tabs may provide additional damping features by designing in gaps or spaces between the tabs and the backing plate, or additionally or alternatively, by having the tabs engage the frictional material of the brake pad assembly.

It is important to note that the construction and arrangement of the brake systems and brake pad assemblies as shown and/or described in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A brake pad assembly, comprising:
a backing plate having a first surface and a second surface opposite the first surface;
a brake liner coupled to the first surface of the backing plate and configured to engage a braking surface of a rotor; and
a shim coupled to the second surface of the backing plate, the shim including a planar body portion and a plurality of tabs integrally formed with and extending from the planar body portion;
wherein a first tab of the plurality of tabs is configured to secure the shim to the backing plate and to engage the braking surface when the brake liner is worn a predetermined amount, and wherein the first tab comprises a pair of resilient spaced-apart extensions extending away from the planar body portion and configured to snap-fit onto the backing plate by first deflecting toward each other and then deflecting away from each other when the shim is being coupled to the backing plate.

2. The assembly of claim 1, wherein at least the first tab and a second tab of the plurality of tabs are configured to secure the shim to the backing plate and to engage the braking surface when the brake liner is worn a predetermined amount, the first and second tabs being spaced apart along a length of the shim and each configured to apply a different amount of force on the liner.

3. The assembly of claim 1, wherein the shim is a multi-layer shim including a first layer coupled to a second layer to form the body portion and the plurality of tabs.

4. The assembly of claim 1, wherein the shim is a first shim, and further comprising a second shim coupled to the first shim.

5. The assembly of claim 4, wherein the second shim is provided between the first shim and the backing plate.

6. The assembly of claim 1, wherein the first tab is received in a channel formed in a side surface of the backing plate, and wherein the channel is configured to permit relative movement of the backing plate and the shim when the liner engages the braking surface.

7. The assembly of claim 1, wherein the first tab is configured to frictionally engage a side surface of the liner.

8. A brake pad assembly, comprising:
a backing plate having a first surface and a second surface opposite the first surface;
a brake liner coupled to the first surface of the backing plate and configured to engage a braking surface; and a shim coupled to the second surface of the backing plate, the shim including a planar body portion and a plurality of tabs integrally formed with and extending from the planar body portion;

wherein a first tab of the plurality of tabs is configured to secure the shim to the backing plate, and wherein a second tab of the plurality of tabs is configured to engage the braking surface when the brake liner is worn a predetermined amount, and wherein the first tab comprises a pair of resilient spaced-apart extensions extending away from the planar body portion and configured to snap-fit onto the backing plate by first deflecting toward each other and then deflecting away from each other when the shim is being coupled to the backing plate.

9. The assembly of claim 8, wherein the first and second tabs are configured to secure the shim to the backing plate and to engage braking surface when the brake liner is worn a predetermined amount.

10. The assembly of claim 8, wherein the shim is a multi-layer shim including a first layer coupled to a second layer to form the body portion and the plurality of tabs.

11. The assembly of claim 8, wherein the shim is a first shim, and further comprising a second shim coupled to the first shim.

12. The assembly of claim 11, wherein the second shim is provided between the first shim and the backing plate.

13. The assembly of claim 8, wherein the first tab is received in a channel formed in a side surface of the backing plate, and wherein the channel is configured to permit relative movement of the backing plate and the shim when the liner engages the braking surface.

14. The assembly of claim 8, wherein one of the first tab and the second tab is configured to frictionally engage a side surface of the liner.

15. A brake pad assembly, comprising:
a backing plate having a first surface, a second surface opposite the first surface, and a channel extending at least partially between the first surface and the second surface;
a brake liner coupled to the first surface of the backing plate and configured to engage a braking surface; and
a shim coupled to the second surface of the backing plate, the shim including a planar body portion and a tab integrally formed with and extending from the planar body portion such that the tab is received within the channel to couple the shim to the backing plate, wherein the tab comprises a pair of spaced-apart extensions extending away from the planar body portion and configured to snap-fit onto the backing plate by first deflecting toward each other and then deflecting away from each other when the shim is being coupled to the backing plate;
wherein the tab and the channel are configured to permit relative movement between the second surface of the backing plate and the shim when the brake liner engages the braking surface.

16. The assembly of claim 15, wherein the tab is configured to both secure the shim to the backing plate and engage the braking surface when the brake liner is worn a predetermined amount.

17. The assembly of claim 15, wherein the shim is a multi-layer shim including a first layer coupled to a second layer to form the body portion and the tab.

18. The assembly of claim 15, wherein the shim is a first shim, and further comprising a second shim coupled to the first shim.

19. The assembly of claim 18, wherein the second shim is provided between the first shim and the backing plate.

20. The assembly of claim 15, wherein the first tab is configured to frictionally engage a side surface of the liner.

* * * * *